Patented May 2, 1939

2,156,499

UNITED STATES PATENT OFFICE 2,156,499

METHOD FOR PROCESSING YEAST FOR COMBINATION WITH FOOD PRODUCTS

Lloyd M. Holcomb, Perry, Iowa

No Drawing. Application October 9, 1937,
Serial No. 168,254

1 Claim. (Cl. 99—136)

The principal object of my invention is to provide a method for processing yeast for combination with various food products such as ice cream or the like that is tasteless in the mixture, yields vitamins $B^1$ and $B^2$ normally found in the yeast and in addition tends to alkalize the completed mixture, thereby stabilizing the yeast content.

A further object of this invention is to provide a method of combining yeast with various other compounds in a dry state which, when the complete mixture is placed in an edible food containing moisture, unite to form several beneficial compounds within the food proper and which will release $CO_2$ gas as a result of the chemical reaction allowing this gas to filter through the mixture, thereby smoothing the texture and aiding in the uniform distribution of the compound throughout the food.

Still further objects of this invention are to provide a method of processing yeast for use with food products that is stable at ordinary temperatures, that is palatable and beneficial to the human body and which gives bulk to the food.

These and other objects will be apparent to those skilled in the art.

It is a recognized fact that yeast is beneficial to the health of the human body containing those essential vitamins $B^1$ and $B^2$ not readily found in other compounds. Yeast heretofore obtainable for consumption or mixing with other food stuff has not been practical because it has a very undesirable taste and this is highly noticeable even when mixed with food having a strong flavor. Regardless of how yeast has been mixed with food a strong after-taste remains after eating and it forms undesirable gases upon contact with body heat and moisture.

A great many people depend upon yeast as a source of essential vitamins and yeast should be included in the diet. It is necessary, however, for yeast to be kept at a comparatively low temperature to prevent development of the yeast and other foreign organisms. Heretofore it has been necessary that yeast, for human consumption, be kept in a refrigerator and due to the fact that no satisfactory method has been devised for the thorough mixing of yeast with an edible food product, the yeast must be taken plain or in its natural state. I have overcome such disadvantages by providing a compound as hereinafter more fully set forth.

My method or process consists in the thorough mixing, in a dry state, of brewer's powdered yeast, sodium bicarbonate, citric acid and India gum or tragacanth. This may be mixed in any suitable proportions but I have found the mixing of 355 grains of yeast to 35 grains of sodium bicarbonate, to 30 grains of citric acid to 60 grains of India gum or tragacanth a highly satisfactory mixture.

All of these compounds are used in a dry powdered or pulverized state and are thoroughly mixed together. A most desirable medium for carrying this compound is ice cream and although it may be applied to any other cold process food, ice cream is the most readily obtainable and the most palatable method of giving yeast to children and furthermore, contains enough moisture to cause the chemical reaction necessary by the mixing of the above named ingredients. The powdered mixture is placed in the ice cream mix, resulting in new compounds being formed upon contact with the moisture increasing the alkaline content of the complete mixture and liberating $CO_2$ gas. The usual method is to start the agitator of the ice cream freezing mechanism after the ice cream mixture has been placed therein and the mixture of yeast, sodium bicarbonate, citric acid, and India gum or tragacanth added to the ice cream mixture while the agitator is in motion.

The reaction will take place and the $CO_2$ gas will bubble throughout the mixture, smoothing it and aiding in the complete mixing of the ingredients with the ice cream mixture. The addition of the India gum or tragacanth acts as a filler or as bulk, lessening the time required to freeze the ice cream and rendering the frozen ice cream smooth and free from yeast taste. The sodium bicarbonate and citric acid unite to form sodium citrate in a small amount; this metabolizes to give an alkaline reaction, however, due to the proportion of sodium bicarbonate to citric acid, there is enough sodium bicarbonate remaining to cause the food mixture to be alkaline.

This tendency toward the alkaline has two advantages; it provides the necessary alkali to the human system to counteract any tendency to acidity and in addition makes the yeast more stable, controlling the growth of yeast and tends to prevent the formation of excessive gas.

Yeast ferments quickly in the presence of an acid. The amount of sodium citrate in a free state is very small and is also beneficial to the human body. The India gum or tragacanth as is well known, expands at a high rate when subjected to moisture, thereby acting as an efficient body and providing bulk in the ice cream or like. By combining these four ingredients in an ice cream mixture, it is immediately noticeable that the yeast can not be tasted nor can any foreign flavor be detected in the ice cream mixture. Furthermore, the ice cream is smooth, creamy and leaves no traces of after-taste in the mouth. Even ice cream without the addition of my mixture leaves an undesirable after-taste. However, due to the reactions between the various component compounds of my mixture in combining, the palatability of the ice cream is enhanced, the bulk of the ice cream is increased, the ice cream is made smoother and provides a wholesome and delectable dish possessing many highly desirable and beneficial qualities. Thus I have provided a palatable method of mixing yeast and other beneficial ingredients with a food which, in addition to the food value of the food proper, is rich in vitamins $B^1$ and $B^2$, the essential vitamins of yeast, which provides a small excess of alkali for combatting acidity, that gives necessary bulk to the food, and aids in the smoothing of the food mixture.

Furthermore, the yeast is more stable within the mixture due to the alkali content of the mixture and the reaction of the ingredients when subjected to moisture forms other compounds of benefit to the human body. Obviously, the India gum or tragacanth does not enter into the compound, but is necessary for the provision of bulk and to smooth the texture of the food mixture. Also the addition of these ingredients to various types of foods aids in the digestability and assimilation of the food.

Some variations may be made in the component elements used in my method for processing yeast for combination with various food products without departing from the ultimate results obtained.

I claim:

The mixing of brewer's powdered yeast and powdered India gum, the addition of sodium bicarbonate and citric acid in such proportions that the resulting reaction will leave sodium citrate and an excess of sodium bicarbonate upon exposure to moisture, the addition of the complete mixture to a moist ice cream mixture, and lastly the freezing of the mass while it is being agitated.

LLOYD M. HOLCOMB.